United States Patent [19]
Moyer

[11] Patent Number: 5,951,678
[45] Date of Patent: Sep. 14, 1999

[54] METHOD AND APPARATUS FOR CONTROLLING CONDITIONAL BRANCH EXECUTION IN A DATA PROCESSOR

[75] Inventor: William C. Moyer, Dripping Springs, Tex.

[73] Assignee: Motorola, Inc., Schaumburg, Ill.

[21] Appl. No.: 08/900,796

[22] Filed: Jul. 25, 1997

[51] Int. Cl.[6] .................................................... G06F 9/00
[52] U.S. Cl. ............................................................ 712/237
[58] Field of Search .................................. 395/584, 583, 395/581; 712/236, 237, 234

[56] References Cited

U.S. PATENT DOCUMENTS

| | | | |
|---|---|---|---|
| 5,228,131 | 7/1993 | Ueda et al. | 712/240 |
| 5,261,063 | 11/1993 | Kohn et al. | 712/229 |
| 5,623,615 | 4/1997 | Salem et al. | 712/238 |
| 5,701,448 | 12/1997 | White | 712/233 |
| 5,734,881 | 3/1998 | White et al. | 712/235 |

*Primary Examiner*—Zarni Maung
*Assistant Examiner*—Kenneth R. Coulter
*Attorney, Agent, or Firm*—Daniel D. Hill; Robert L. King

[57] ABSTRACT

A pipelined data processing system (10) includes a scheme for selectively controlling forward branch prediction and backward branch prediction, as well as prefetching and conditional execution of instructions for various branch scenarios. A three bit programmer accessible control field (19) is used to specify the type of activity to be used with a conditional branch instruction by allowing the independent control of prefetching of instructions for both forward and backward conditional branches. Also, control over conditional execution is provided for both forward and backward branches. By allowing independent control of forward and backward branch prediction and conditional execution, pipeline stalls can be reduced and more flexible program execution can be achieved for different environments.

17 Claims, 7 Drawing Sheets

| CONTROL FIELD | BRANCH DIRECTION | APPLICABLE CASE(S) |
|---|---|---|
| 000 | FORWARD | 1 |
| 000 | BACKWARD | 1 |
| 001 | FORWARD | 1 |
| 001 | BACKWARD | 2, 3 |
| 010 | FORWARD | 1 |
| 010 | BACKWARD | 6, 7 |
| 011 | FORWARD | 4, 5 |
| 011 | BACKWARD | 2, 3 |
| 100 | FORWARD | 2, 3 |
| 100 | BACKWARD | 2, 3 |
| 101 | FORWARD | 2, 3 |
| 101 | BACKWARD | 6, 7 |
| 110 | FORWARD | 6, 7 |
| 110 | BACKWARD | 6, 7 |
| 111 | FORWARD | 8, 9 |
| 111 | BACKWARD | 6, 7 (COULD HAVE 8, 9) |

*FIG. 12*

METHOD AND APPARATUS FOR CONTROLLING CONDITIONAL BRANCH EXECUTION IN A DATA PROCESSOR

FIELD OF THE INVENTION

This invention relates to data processing, and more specifically to a method and apparatus for controlling conditional branch execution in a data processor.

BACKGROUND OF THE INVENTION

A data processing system is "pipelined" if it includes a number of stages for program execution. For example, a four stage pipeline may include a fetch stage, decode stage, execution stage, and a write-back stage. During the fetch stage, a next instruction is retrieved from a memory location. Then the instruction is decoded, executed, and written back to a location in memory, or to a register. Each of these stages may require one or more clock cycles to complete. Also, simultaneously with the first instruction being decoded, a second instruction may be fetched, and while the first instruction is being executed, the second instruction may be decoded, and so forth, so that the "pipeline" remains full.

Pipelined data processing systems may incur execution penalties when a program being executed includes a change of flow instruction. When a change of flow occurs, it may be necessary for the data processing system to stop execution of program flow in order to refill the instruction pipeline.

Various schemes such as branch prediction, prefetching and conditional execution are among the techniques used to improve performance when a change of flow is incurred. However, many of these schemes add increased complexity to the data processing system and may not be effective in every environment. Therefore, a need exists for providing control over branch prediction destination prefetching and conditional execution that is adaptable for different environments.

DETAILED DESCRIPTION OF A PREFERRED EMBODIMENT

Generally, the present invention provides a data processing system and method for selectively controlling forward branch prediction and backward branch prediction, as well as prefetching and conditional execution of instructions for various branch scenarios. A three bit programmer accessible control field is used to specify the type of activity to be used with a conditional branch instruction by allowing the independent control of prefetching of instructions for both forward and backward conditional branches. Also, control over conditional execution is provided for both forward and backward branches. By allowing independent control of forward and backward branch prediction and conditional execution, pipeline stalls can be reduced and more flexible program execution can be achieved for different environments. More specifically, the present invention may be further described with reference to FIGS. 1–12.

Figure 1:
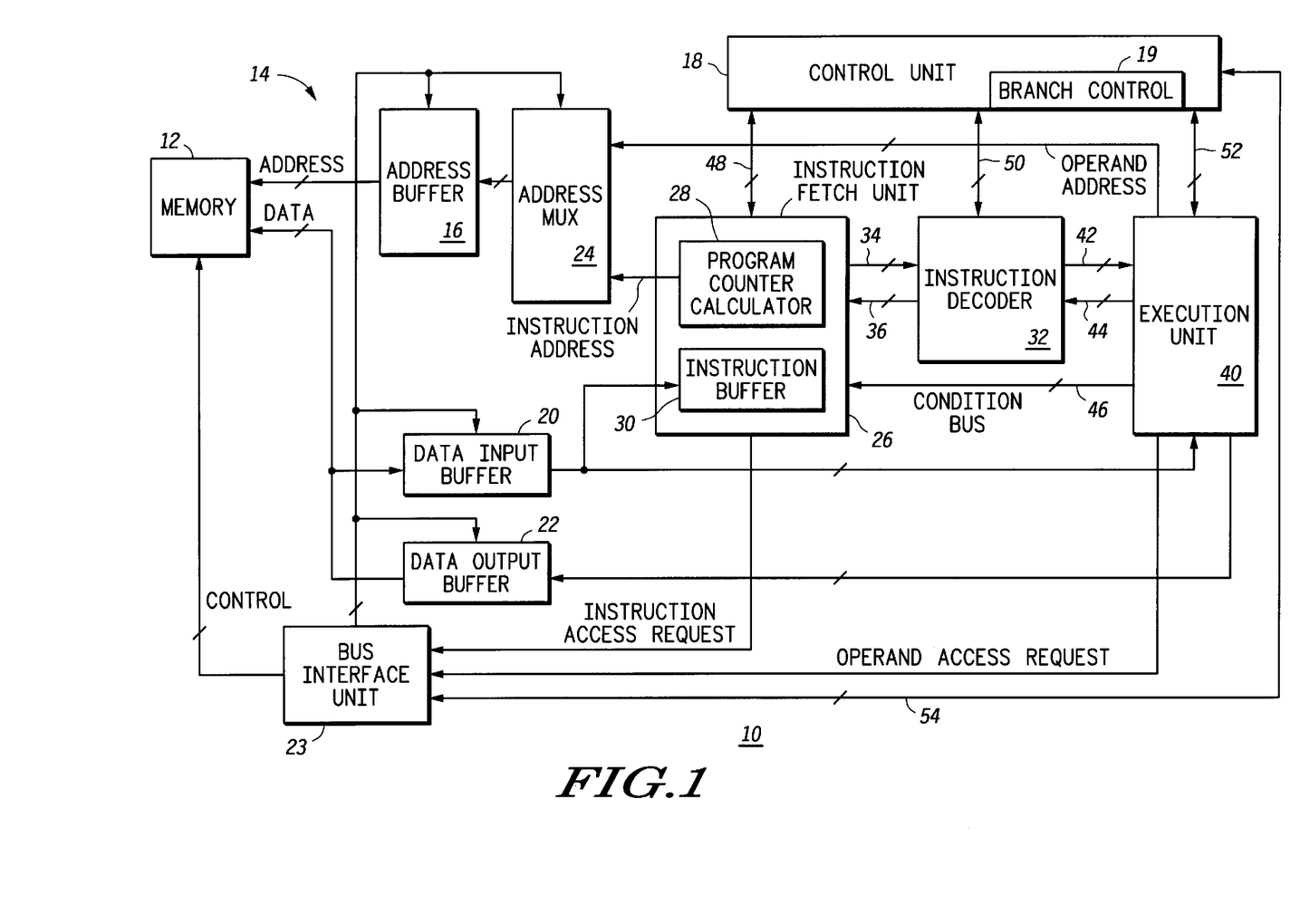
FIG. 1 illustrates, in block diagram form, a pipelined data processing system in accordance with the present invention.

FIG. 1 illustrates, in block diagram form, a pipelined data processing system 10 in accordance with the present invention. Data processing system 10 includes memory 12 and data processor 14. Data processor 14 includes address buffer 16, address multiplexer 24, control unit 18, branch control bit field 19, instruction fetch unit 26, instruction decoder 32, execution unit 40, bus interface unit 23, data input buffer 20, and data output buffer 22. Instruction fetch unit 26 includes program control calculation block 28 and instruction buffer 30.

Memory 12 is coupled to an address bus for receiving an address, and to a data bus for receiving and providing data. Memory 12 can be any kind of conventional memory including volatile memories such as static random access memories (SRAMs), and dynamic random access memories (DRAMs) or non-volatile memories such as electrically programmable read only memories (EPROM) and flash memory. Also, memory 12 may be on the same integrated circuit as processor 14 or may be located externally to processor 14. Address multiplexer 24 has a first plurality of input terminals for receiving an operand address from execution unit 40, a second plurality of input terminals for receiving an instruction address from instruction fetch unit 26, and a plurality of output terminals coupled to address buffer 16. Address multiplexer 24 is controlled by bus interface unit 23 for directing either the operand address or the instruction address to memory 12. Instruction fetch unit 26 is coupled to data input buffer 20 for sequentially fetching selected instructions from memory 12.

Instruction decoder 32 is coupled to instruction fetch unit 26 via buses 42 and 44. Instruction fetch unit 26 provides an instruction address to obtain an instruction encoding value. Instruction decoder 32 receives the instruction encoding value from instruction fetch unit 26, prepares the instruction encoding value by translating the instruction encoding value into a format which can be executed by data processor 14, and selectively decodes the instructions which are fetched by instruction fetch unit 26. Instruction decoder 32 is coupled to execution unit 40 via buses 42 and 44. Execution unit 40 is coupled to data input buffer 20 for receiving data from memory 12. Likewise, execution unit 40 is coupled to data output buffer 22 for providing data to memory 12. Execution unit 40 selectively executes the instructions which are decoded by instruction decoder 32, and provides the result to data output buffer 22. Execution unit 40 may include, for example, an arithmetic logic unit (ALU).

Bus interface unit 23 receives an operand access request from instruction unit 40, and in response, provides access control signals to memory 12 for accessing data to be operated on. Also, bus interface unit 23 is coupled to instruction fetch unit 26 for receiving an instruction access request for accessing memory 12 for instructions. Bus interface unit 23 is bidirectionally coupled to control unit 18 via a bus 54 for coordinating instruction sequencing in data processing system 10.

Control unit 18 is bi-directionally coupled to instruction fetch unit 26 via control bus 48 for controlling the operation of instruction fetch unit 26. Control unit 18 is bi-directionally coupled to instruction decoder 32 via control bus 50 and control unit 18 is bi-directionally coupled to execution unit 40 via control bus 52. Execution unit 40 is coupled to instruction fetch unit 26 via condition bus 46 for providing condition information to instruction fetch unit 26.

In the illustrated embodiment, branch control field 19 is a three bit control field of a register within control unit 18 which stores information for selecting policies for controlling forward and backward branch prefetching and conditional instruction execution. In other embodiments, the control field may include one or more bits. The control field 19 directly controls instruction fetch unit 26 by disabling instruction fetch unit 26 for a predetermined amount of time in response to a conditional flow instruction (conditional branch instruction) being detected by the instruction decoder 32. The control unit provides a control signal to instruction fetch unit 26 in response to the value stored in branch control field 19. Branch control field 19 determines one of several modes of operation in which instruction fetch unit 26 fetches further instructions when instruction decoder 32 determines that a conditional branch instruction has been encountered (see FIG. 12). The modes of operation are determined by the direction of instruction flow (backward branch or a forward branch) indicated by the conditional branch instruction. The conditional flow instruction may be, for example, a trap or a jump instruction.

Disabling instruction fetch unit 26 reduces overhead of data processing system 10 by completely avoiding a fetch operation until the predetermined amount of time has elapsed. After the predetermined amount of time elapses, instruction fetch unit 26 automatically resumes operation. Instruction fetch unit 26 may also be disabled for both forward and backward branches.

Data processing system 10 executes instructions in a four stage pipeline. The four stages include a fetch stage, a decode stage, an execution stage, and a write back stage. During the instruction fetch stage, an instruction is retrieved from memory, such as from memory 12. The instruction is then decoded in instruction decoder 32. The decoded instruction is provided to execution unit 40 via bus 42. The execution unit 40 executes the instruction and then writes back the results to memory 12 via data output buffer 22.

Figure 2:
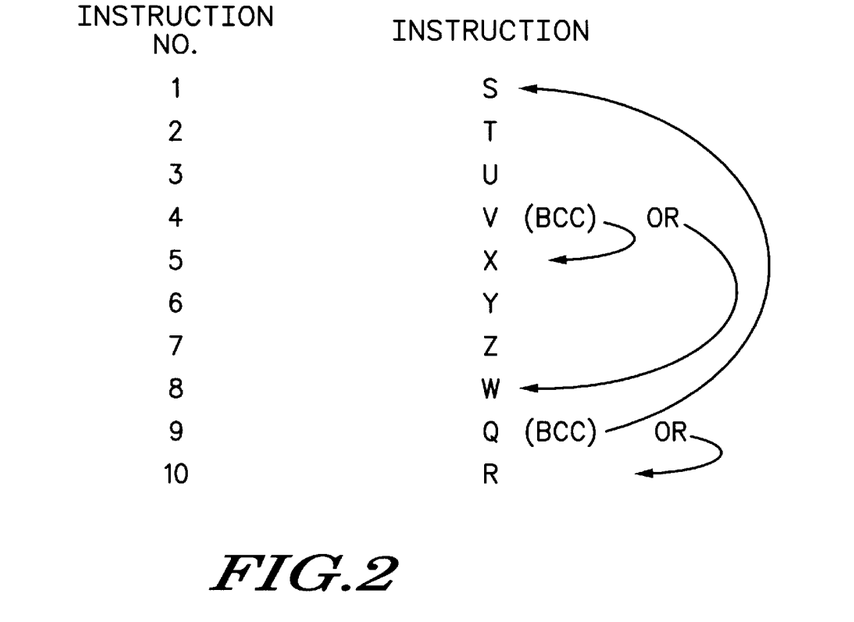
FIG. 2 illustrates a series of instructions which are helpful for describing the present invention.

FIG. 2 illustrates a series of instructions which are helpful for describing the present invention. For purposes of describing the invention, the type of instruction is not important. Therefore, the instruction associated with each instruction number in FIG. 2 is represented by a single letter. In the course of executing the instructions of FIG. 2, data processing system 10 will sequentially execute each instruction until encountering an instruction that requires data processing system 10 to go to another instruction which may not be the next sequential instruction, such as for example, a conditional branch instruction. In FIG. 2, instruction number 4 illustrates a conditional branch instruction labeled "V". After executing instruction V, the data processing system 10 is required to either execute the next instruction in the sequence or go to instruction W based on a result obtained after executing instruction V. The conditional flow is represented with curved arrows originating at instruction V. In order to more efficiently execute the series of instructions shown in FIG. 2, data processing system 10 may try to predict whether the branch is to instruction X or to instruction W based on the predetermined control information contained in branch control field 19. In addition to determining whether or not to perform branch prediction, branch control field 19 may also be used to determine whether or not conditional execution of a predicted next instruction step is performed.

Branch control field 19 allows independent control over prefetching, prediction and conditional execution associated with conditional flow instructions. According to one aspect of the invention, based on the control bits of branch control field 19, a next instruction is not fetched until a condition is resolved in the current instruction being executed. Since the next instruction is not fetched, a delay caused by prefetching an instruction which may later be discarded in data processing unit 10 is reduced. Also, power consumption may be reduced by eliminating unnecessary prefetching and execution. In addition, the data processing system executes instructions faster and more efficiently. In addition, the invention adds flexibility by allowing the user to choose to prefetch a backward branch but not a forward branch, if that would cause the particular program to be more efficiently executed in a pipelined processor.

FIGS. 3–11 illustrate, in timing diagram form, various cases for describing branch control in accordance with the present invention. The examples illustrated in FIGS. 3–11 use the instruction flow of FIG. 2 for illustration purposes.

Figure 3:
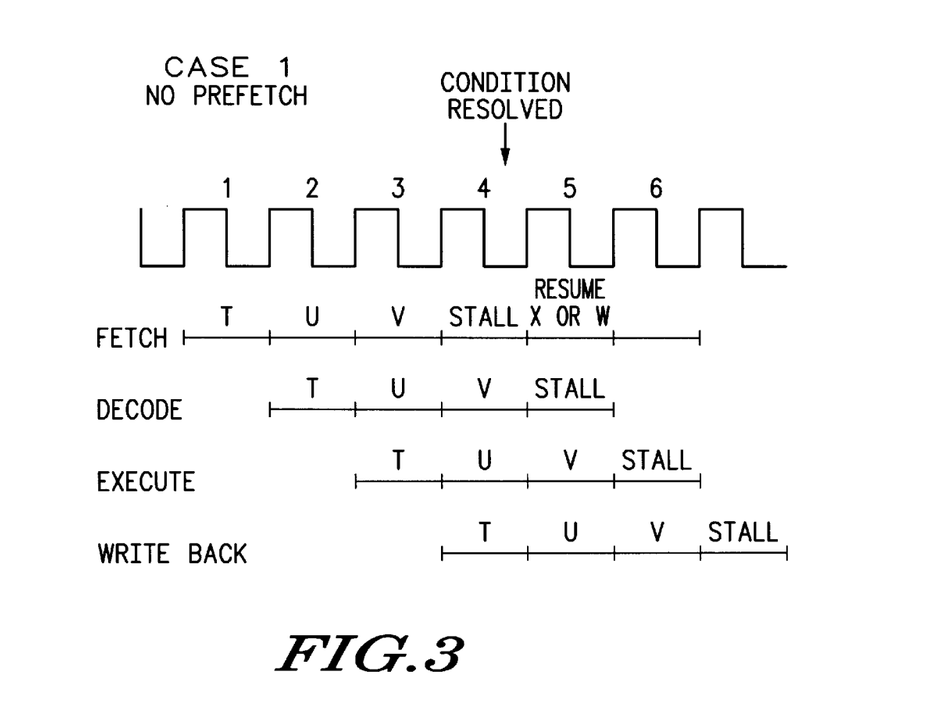
FIGS. 3–11 illustrate, in timing diagram form, various cases for illustrating branch control in accordance with the present invention.

FIG. 3 illustrates a timing diagram of a CASE 1 in which no prefetch in either a forward or a backward branch in data processing system 10 is performed. In FIG. 3, each of the four pipeline stages of data processor 10 are illustrated. During a first clock cycle, instruction T, which is instruction 2 in FIG. 2, is fetched. During a second clock cycle, instruction U is fetched, and simultaneously with instruction U being fetched, instruction T is decoded. At clock cycle 3, instruction V is fetched while instruction U is decoded. Instruction V is illustrated as being a forward branch instruction as indicated by the arrows pointed to instruction X and instruction W. If the control bits in branch control field 19 (FIG. 1) indicate that no forward branches are to be prefetched, then at clock cycle 4, processor 10 will not prefetch the next instruction as indicated by the word "stall". However, instruction V will be decoded and instruction U executed since they are in later stages of the pipeline. The stall at clock cycle 4 is inserted to allow instruction V to resolve in order to know whether instruction X or instruction W is to be fetched in the next clock cycle. Once the condition is resolved as indicated at the end of clock cycle 4, the appropriate instruction can then be fetched. See FIG. 12 for the control field values that apply to CASE 1.

Figure 4:
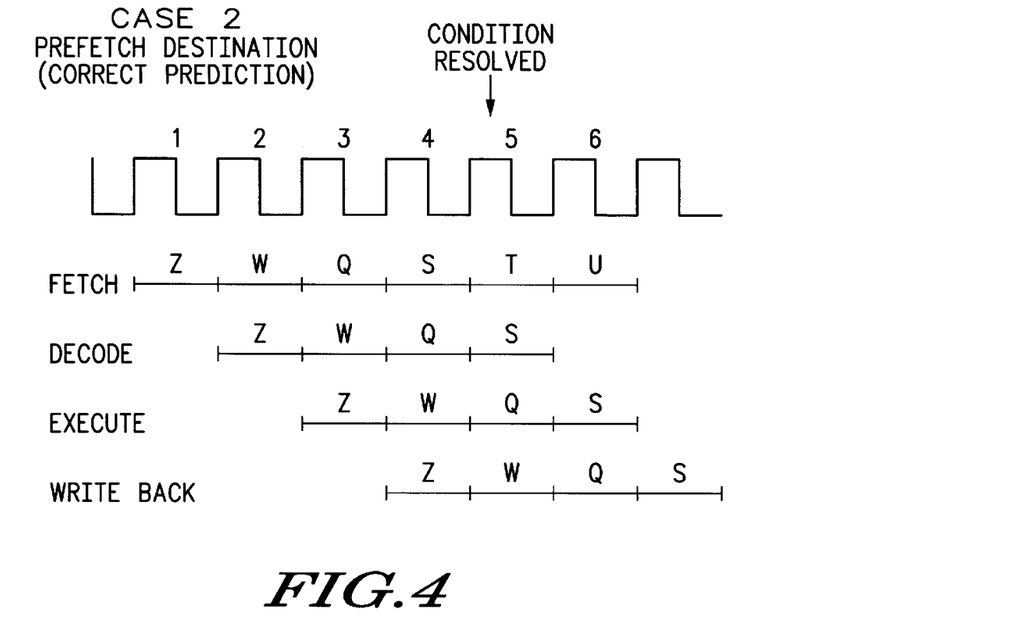

FIG. 4 illustrates, in timing diagram form, a CASE 2 where the prefetch destination was correctly predicted. For illustration purposes, FIG. 4 illustrates a backward branch. However, FIG. 4 would apply equally to a forward branch. In clock cycle 1, instruction Z, illustrated in FIG. 2, is fetched. At clock cycle 2, the next sequential instruction, instruction W, is fetched while instruction Z is being decoded. At clock cycle 3, instruction Q is fetched, instruction W is decoded, and instruction Z is executed. Instruction Q is a conditional backward branch instruction where the next instruction can be instruction S or instruction R. For purposes of illustration, instruction S is predicted to be the next instruction. So, instruction S is prefetched, instruction Q is decoded, instruction W is executed, and instruction Z is written back. At the end of clock cycle 4, the condition is resolved to indicate that instruction S was the correct instruction and at clock cycle 5, instruction S is then decoded while instruction T is prefetched, instruction Q is executed, and instruction W is written back. No pipeline stalls are incurred in CASE 2.

Figure 5:
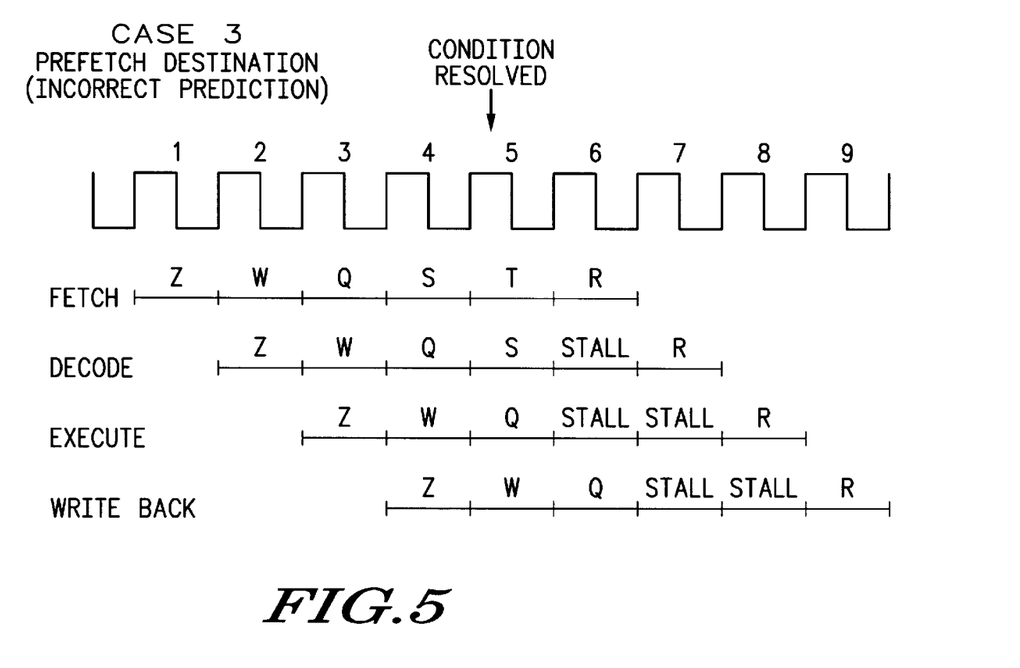

FIG. 5 illustrates, in timing diagram form, a CASE 3 where a prefetch destination is incorrectly predicted. At clock cycle 1, instruction Z (FIG. 2) is fetched. At clock cycle 2, instruction W is fetched and at clock cycle 3, instruction Q is fetched, and instruction Q is a conditional backward branch instruction. If backward branch prefetch has been selected in branch control field 19, instruction S is prefetched at clock cycle 4. (See FIG. 12 for the control field values that apply to CASE 3.) During clock cycle 5, instruction Q is executed and it is determined that the prefetch of instruction S was incorrect. The pipeline stalls while the correct instruction, instruction R is fetched. Once instruction R is fetched at clock cycle 6, normal execution resumes.

Figure 6:
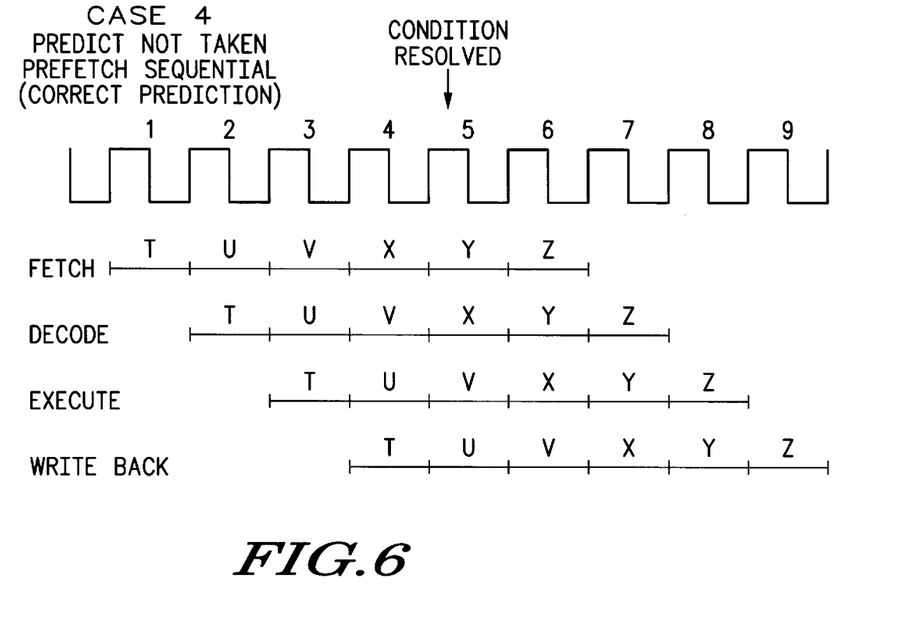

FIG. 6 illustrates, in timing diagram form, a CASE 4 where a sequential prefetch is correctly predicted. At clock cycle 3, branch instruction V is fetched because branch control field 19 indicates that the prefetch should be sequential. During clock cycle 4, instruction X is fetched. At clock cycle 5 instruction V is executed and the condition is resolved to indicate that instruction X was the correct instruction to prefetch. Normal execution continues with instruction X.

Figure 7:
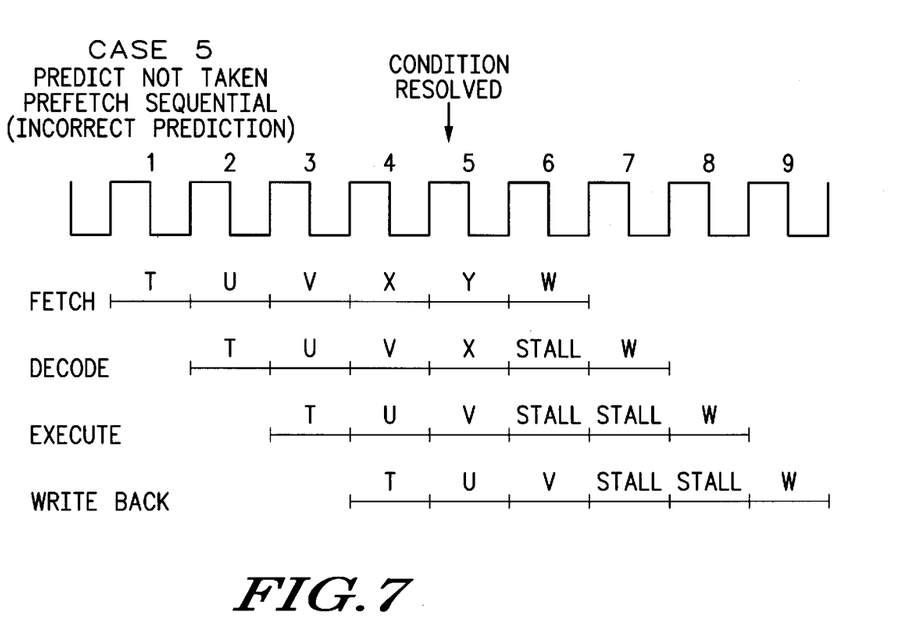

FIG. 7 illustrates, in timing diagram form, a CASE 5 where the instruction prefetch is sequential and incorrectly predicted. At clock cycle 3, instruction V is prefetched, where instruction V is a conditional forward branch instruction. Since the next instruction is instruction X at clock cycle 4, instruction X is fetched. At clock cycle 5, instruction V is executed. The condition is resolved indicating that instruction X was the incorrect instruction to prefetch. Since the prefetch was incorrect, at clock cycle 6, the correct instruction, instruction W, is fetched and the pipeline is refilled.

Figure 8:
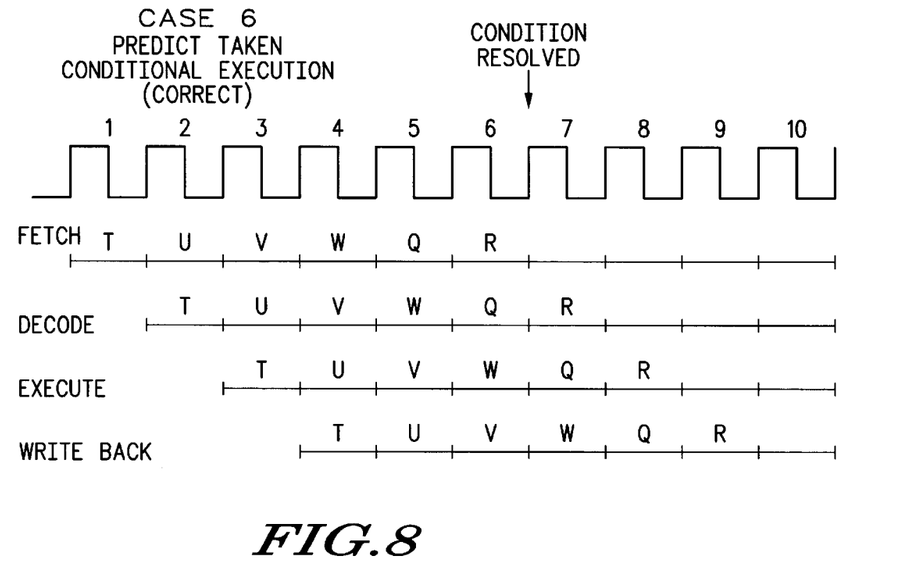

FIG. 8 illustrates, in timing diagram form, a CASE 6 where conditional execution has been enabled and a prediction of branch taken was correct. At clock cycle 3, a forward branch instruction V is fetched. The branch was predicted to be taken, so instruction W is fetched. Instruction W is executed at clock cycle 6 before the condition is resolved. After clock cycle 6, the condition is resolved, and the prediction was correct, so the pipeline flow can continue.

Figure 9:
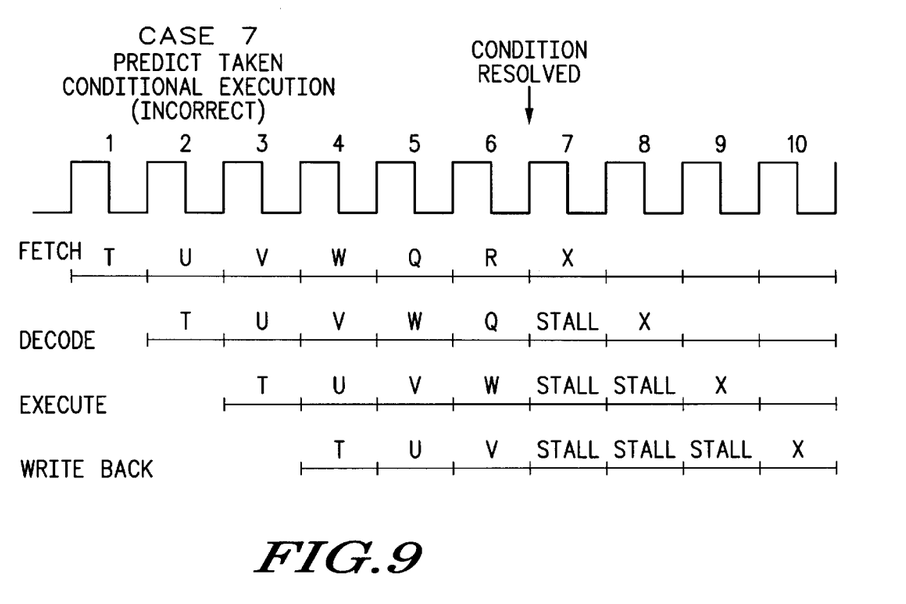

FIG. 9 illustrates, in timing diagram form, a CASE 7 illustrating a conditional execution where a branch was incorrectly predicted as taken. As discussed above for FIG. 8, instruction W is predicted to be the next instruction. However, in this case instruction W is the incorrect instruction. So, at the end of clock cycle 6, the condition is resolved and at clock cycle 7, the correct instruction, instruction X, is fetched and the pipeline must be refilled with the correct instructions.

Figure 10:
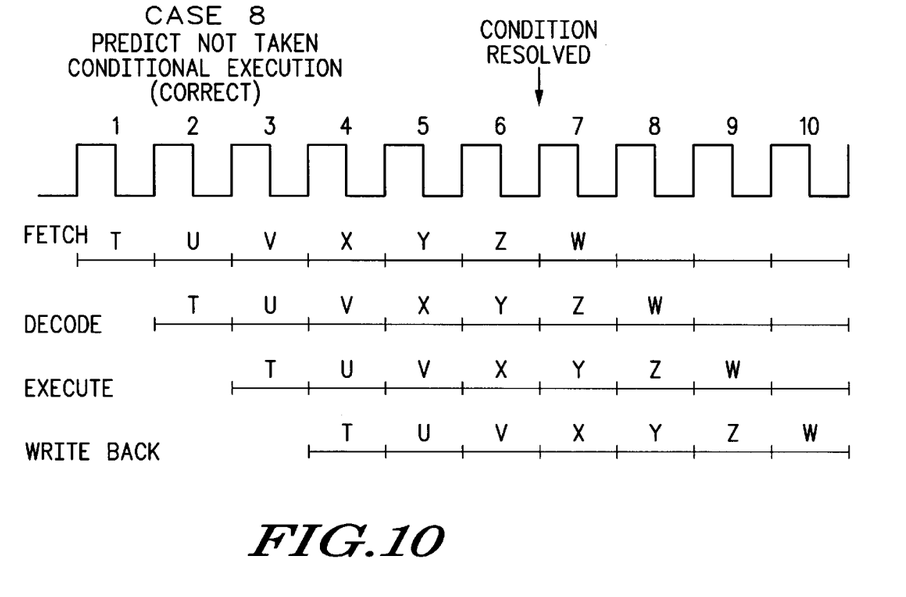

FIG. 10 illustrates, in timing diagram form, a CASE 8 illustrating conditional execution where a branch was correctly predicted as not taken. At clock cycle 3, instruction V is the forward branch instruction, and because the prediction is not taken, the next sequential instruction, instruction X, is fetched. At the end of clock cycle 6 when instruction X is executed, the condition is resolved correctly and the pipeline flow remains undisturbed.

Figure 11:
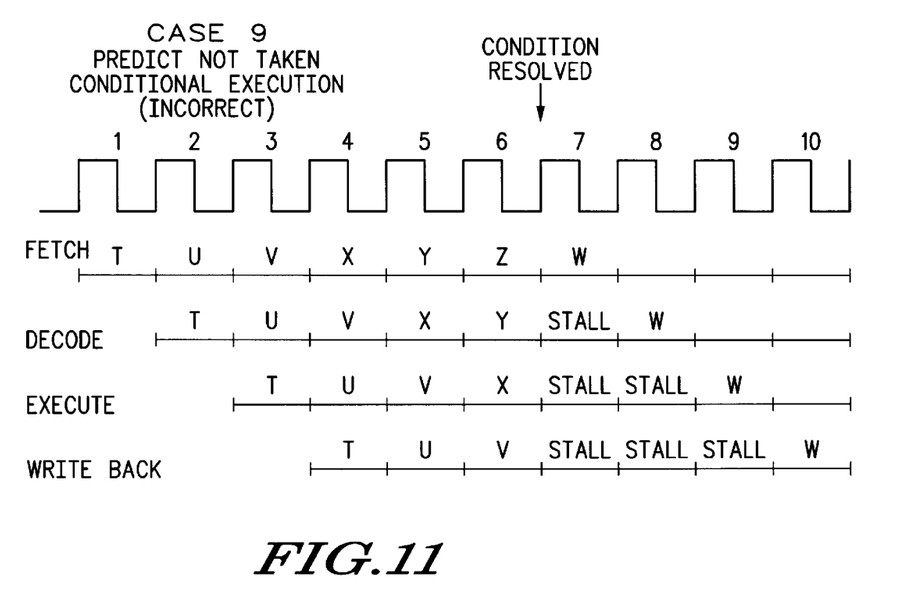

FIG. 11 illustrates, in timing diagram form, a CASE 9 showing conditional execution where the branch prediction was incorrectly predicted as not taken. After fetching the branch instruction V at clock cycle 3, the next sequential instruction to be fetched is instruction X (see FIG. 2). At the end of clock cycle 6 in FIG. 11, the condition resolves incorrectly. Because the correct instruction should have been instruction W, instruction W is fetched at clock cycle 7 and the pipeline stalls while it is being filled with the correct instructions.

Figure 12:
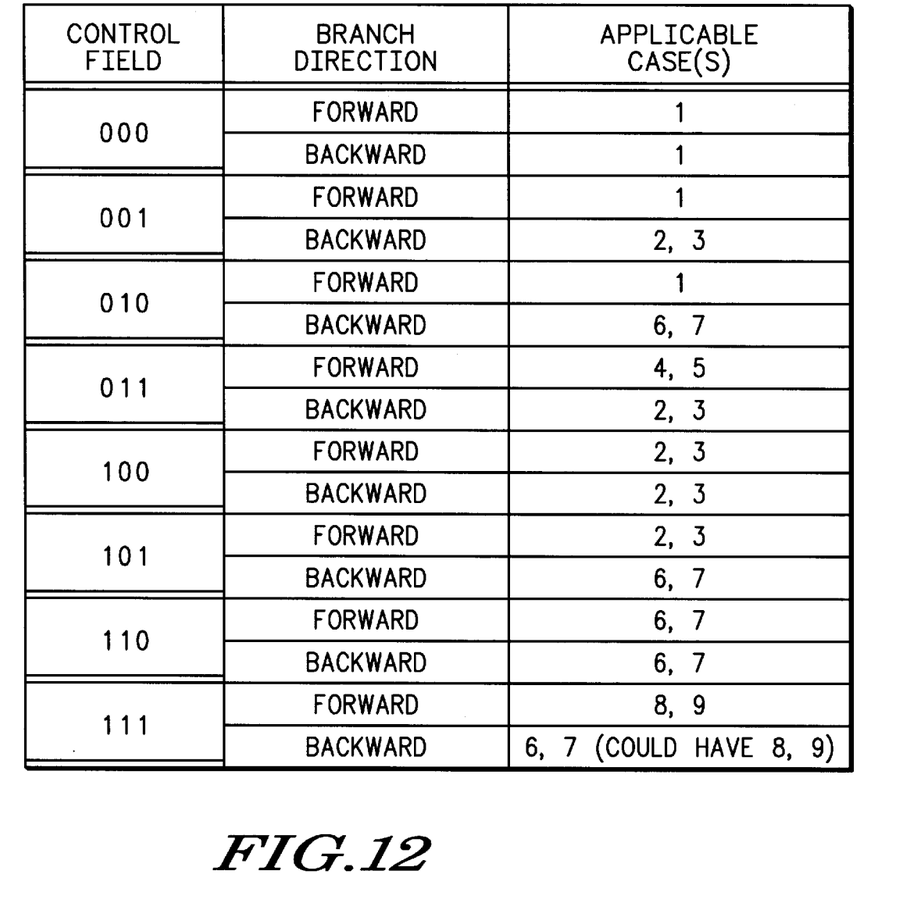
FIG. 12 illustrates a table of control values for the branch control field of FIG. 1 and the applicable CASES 1–9 that correspond to the action associated with each control value.

FIG. 12 illustrates a table of control values for branch control field 19 of FIG. 1 and the applicable CASES 1–9 that correspond to each control value. Branch control field 19 is part of a programmer's model for data processing 10. In the illustrated embodiment branch control field 19 can be updated by inserting appropriate instructions within the sequence of instructions to be executed. This allows for efficient use of branch prediction in both forward and backward conditional branching for both prefetching and conditional execution.

The following is a summary of the actions that are taken for each control value in FIG. 12:

If the branch control field includes 000—Prefetch predict for either forward or backward branches are not made until branch conditions are resolved;

If the branch control field includes 001—The destination of a backward branch is prefetched, but there is no prefetch prediction for forward branches;

If the branch control field includes 010—Prefetch the destination and allow conditional execution of a backward branch destination (i.e., predict backwards is taken and prefetch destination, with conditional execution), no prefetch prediction for forward branches;

If the branch control field includes 011—Prefetch destination of backward branch (i.e., predict taken and prefetch destination, but no conditional execution), prefetch sequential instruction for forward branches (i.e., predict not taken, but no conditional execution);

If the branch control field includes 100—Prefetch destination of both branch directions (i.e., predict taken, but no conditional execution);

If the branch control field includes 101—Prefetch the destination of both branch directions, allow conditional execution of predicted backward branches (i.e., predict taken, but no conditional execution for forward branches).

If the branch control field includes 110—Prefetch destination of both branch directions, allow conditional execution of predicted branches (i.e., predict taken, and allow conditional execution for all branches); and If the branch control field includes 111—Prefetch destination of backward branch, allow conditional execution of predicted backward branches (i.e. predict taken and prefetch destination, allow conditional execution). Prefetch sequential instruction for forward branches (i.e., prediction not taken, allow conditional execution).

By independently allowing control over prefetching prediction and conditional execution for branch instructions, processing time may be used more efficiently since pipeline stalls as a result of incorrect predictions can be reduced.

Although the invention has been described and illustrated with reference to specific embodiments thereof, it is not intended that the invention be limited to these illustrative embodiments. Those skilled in the art will recognize that variations and modifications can be made without departing from the spirit of the invention. Thus it is intended to encompass within the invention all such variations and modifications falling within the scope of the appended claims.

What is claimed is:

1. A method of implementing conditional branch execution in a data processor, comprising the steps of:

fetching a plurality of instructions to be executed with an instruction fetch unit;

decoding the instructions for execution by an execution unit; and controlling operation of the data processor with a control circuit which provides a control signal to the instruction fetch unit in response to detecting a conditional branch instruction, the control signal respectively controlling, based on a determination of whether a direction of change instruction flow required by the conditional branch instruction is forward or backward, whether to make the instruction fetch unit fetch and conditionally execute additional instructions in a sequential manner or to fetch and conditionally execute additional instructions by jumping to a predicted destination instruction.

2. A data processor which executes a plurality of instructions, including at least one change of flow instruction, comprising:

an instruction prefetch unit for sequentially fetching selected ones of the plurality of instructions;

an instruction decode unit coupled to the instruction prefetch unit for selectively decoding the selected ones of the plurality of instructions which are fetched by the instruction prefetch unit;

an instruction execution unit coupled to the instruction decode unit, the instruction execution unit selectively executing the plurality of instructions which are decoded by the instruction decode unit; and a control unit coupled to the instruction prefetch unit, the instruction decode unit and the instruction execution unit, the control unit having a stored control value which directly controls the instruction prefetch unit by selectively disabling for a predetermined amount of time the instruction prefetch unit from fetching any further instructions in direct response to a conditional flow instruction being detected by the instruction decode unit, the disabling of the instruction prefetch unit reducing overhead of the data processor by completely avoiding a fetch operation until the predetermined amount of time has elapsed, at which time prefetching by the instruction prefetch unit is automatically resumed.

3. The data processor of claim 2 wherein the conditional flow instruction is a conditional branch instruction.

4. The data processor of claim 3 wherein the instruction prefetch unit is disabled from fetching further instructions in response to detecting the conditional branch instruction, regardless of the direction in instruction flow indicated by the detection of the conditional branch instruction.

5. The data processor of claim 2 wherein the predetermined amount of time in which the stored control value disables the instruction prefetch unit from fetching any further instructions is an amount of time required until a condition upon which the conditional flow instruction is based has been resolved.

6. The data processor of claim 2 wherein the stored control value further comprises a multi-bit value which is additionally used by the data processor to control additional instruction execution functions, the additional instruction execution functions comprising controlling prefetching of further instructions following the conditional flow instruction based upon a direction of flow indicated by the conditional flow instruction.

7. The data processor of claim 2 wherein the conditional flow instruction is one of a trap or jump instruction.

8. In a data processor, an apparatus for controlling conditional branch instruction execution, comprising:

an instruction fetch circuit which provides an instruction address to obtain an instruction encoding value, the instruction fetch circuit having a control input;

an instruction decoder having an input coupled to the instruction fetch circuit for receiving the instruction encoding value, the instruction decoder preparing the instruction encoding value by translating the instruction encoding value into a format which can be executed by the data processor;

an execution unit coupled to the instruction decoder for executing instructions; and a control unit coupled to each of the instruction fetch circuit, the instruction decoder and the execution unit, the control unit providing a control signal to the control input of the instruction fetch circuit in response to a branch control value, the branch control value determining one of plural modes of operation in which the instruction fetch circuit fetches further instructions when the instruction decoder determines that a conditional branch instruction has been encountered, the plural modes of operation being determined by a direction of instruction flow indicated by the conditional branch instruction.

9. The apparatus of claim 8 wherein the plural modes of operation in which the fetch circuit fetches further instructions, comprise:

a first mode in which the instruction fetch circuit is disabled from fetching additional instructions when a first change of flow direction is indicated, the disablement continuing until a condition upon which the conditional branch instruction is based becomes resolved; and a second mode in which the instruction fetch circuit performs fetching of additional instructions when a second change of flow direction is indicated.

10. In a data processor, an apparatus for controlling conditional branch instruction execution, comprising:

an instruction fetch circuit which provides an instruction address to obtain an instruction encoding value, the instruction fetch circuit having a control input;

an instruction decoder having an input coupled to the instruction fetch circuit for receiving the instruction encoding value, the instruction decoder preparing the instruction encoding value by translating the instruction encoding value into a format which can be executed by the data processor;

an execution unit coupled to the instruction decoder for executing instructions; and a control unit coupled to each of the instruction fetch circuit, the instruction decoder and the execution unit, the control unit providing a branch control signal to the control input of the instruction fetch circuit in response to detecting a conditional branch instruction, the branch control signal respectively determining, based on an indication of whether the direction of change of instruction flow is forward or backward, prefetching of, and conditional execution of, additional instructions or prefetching of additional instructions without permitting execution of the additional instructions until the condition becomes resolved.

11. The apparatus of claim 10 wherein the branch control signal is stored in a register in the control unit.

12. The apparatus of claim 10 wherein the branch control signal is a multivalued signal which further indicates to the instruction fetch circuit whether to selectively disable the instruction fetch circuit from fetching any additional instructions until a predetermined amount of time has elapsed or whether to selectively prefetch, but not execute, additional instructions.

13. A data processor having conditional branch execution comprising:

a fetch unit for fetching a plurality of instructions to be executed, the fetch unit having a control input;

a decoder coupled to the fetch unit, the decoder receiving instructions from the fetch unit and decoding the instructions for execution;

an execution unit coupled to the decoder, the execution unit receiving fetched instructions and executing the fetched instructions; and a control circuit coupled to each of the fetch unit, the decoder and the execution unit for controlling operation of the data processor, the control circuit providing a control signal to the control input of the fetch unit in response to detecting a conditional branch instruction, the control signal respectively determining, based on a determination of whether a direction of change instruction flow required by the conditional branch instruction is forward or backward, whether to control the fetch unit to fetch and conditionally execute additional instructions in a sequential manner or to fetch and conditionally execute additional instructions by jumping to a predicted destination instruction.

14. The data processor of claim 13 wherein the control circuit further comprises:

an encoded value for the control signal in which the fetch unit will conditionally execute additional instructions in sequential order from the conditional branch instruction in response to the conditional branch instruction indicating a first direction of instruction flow, and the fetch unit will conditionally execute additional instructions by jumping to the predicted destination instruction in response to the conditional branch instruction indicating a second direction of instruction flow.

15. A method of implementing an instruction change of flow in a data processor, comprising the steps of:

sequentially fetching with an instruction prefetch unit selected ones of a plurality of instructions;

selectively decoding the selected ones of the plurality of instructions which are fetched;

selectively executing the selected ones of the plurality of instructions which are decoded; and using a control value which directly controls the instruction prefetch unit by selectively disabling for a predetermined amount of time the instruction prefetch unit from fetching any further instructions in direct response to a conditional flow instruction being detected, the disabling reducing overhead of the data processor by completely avoiding a fetch operation until the predetermined amount of time has elapsed, at which time prefetching by the instruction prefetch unit is automatically resumed.

16. The method of claim 15 further comprising using a multi-bit value as the control value to control additional instruction execution functions, the additional instruction execution functions comprising controlling prefetching of further instructions following the conditional flow instruction based upon a direction of flow indicated by the conditional flow instruction.

17. In a data processor, a method for controlling conditional branch instruction execution, comprising:

fetching an instruction address and obtaining an instruction encoding value;

decoding the instruction encoding value;

executing the instruction encoding value; and providing a control signal for controlling the fetching, the control signal being provided in response to a branch control value, the branch control value determining one of plural modes of instruction fetching in which further instructions are fetched when a conditional branch instruction has been encountered, the plural modes of operation being determined by a direction of instruction flow indicated by the conditional branch instruction.

* * * * *